US007923976B2

(12) United States Patent
Al-Shyoukh et al.

(10) Patent No.: US 7,923,976 B2
(45) Date of Patent: Apr. 12, 2011

(54) FAULT PROTECTION CIRCUIT, METHOD OF OPERATING A FAULT PROTECTION CIRCUIT AND A VOLTAGE REGULATOR EMPLOYING THE SAME

(75) Inventors: Mohammad A. Al-Shyoukh, Richardson, TX (US); Eric C. Blackall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 12/329,537

(22) Filed: Dec. 5, 2008

(65) Prior Publication Data

US 2009/0167266 A1 Jul. 2, 2009

Related U.S. Application Data

(63) Continuation-in-part of application No. 11/967,506, filed on Dec. 31, 2007.

(60) Provisional application No. 60/882,680, filed on Dec. 29, 2006.

(51) Int. Cl.
*H02H 7/12* (2006.01)

(52) U.S. Cl. ............................ 323/270; 361/18; 363/50

(58) Field of Classification Search .................. 323/270, 323/273–281, 269; 361/18, 84, 93.1, 91.5–91.6; 363/50
See application file for complete search history.

(56) References Cited

U.S. PATENT DOCUMENTS

| | | | | |
|---|---|---|---|---|
| 5,172,290 | A * | 12/1992 | Leipold et al. | 361/56 |
| 5,272,399 | A * | 12/1993 | Tihanyi et al. | 327/379 |
| 7,119,999 | B2 | 10/2006 | Baldwin et al. | |
| 2005/0275394 | A1 * | 12/2005 | Moraveji et al. | 323/312 |
| 2008/0284391 | A1 | 11/2008 | Al-Shyoukh et al. | |

* cited by examiner

*Primary Examiner* — Harry Behm
(74) *Attorney, Agent, or Firm* — William B. Kempler; Wade J. Brady, III; Frederick J. Telecky, Jr.

(57) ABSTRACT

Embodiments of the present disclosure provide a fault protection circuit, a method of operating a fault protection circuit and a voltage regulator. In one embodiment, the fault protection circuit is for use with the voltage regulator and includes an output power section having first and second MOS transistors configured to provide a regulated voltage on an output node of the voltage regulator. The fault protection circuit also includes a gate pull-down section connected to the first and second MOS transistors and configured to provide a gate pull-down MOS transistor to limit a current through the first and second MOS transistors during a current overload fault condition on the output node.

15 Claims, 2 Drawing Sheets

FAULT PROTECTION CIRCUIT, METHOD OF OPERATING A FAULT PROTECTION CIRCUIT AND A VOLTAGE REGULATOR EMPLOYING THE SAME

CROSS-REFERENCE TO RELATED APPLICATIONS

This application is a continuation-in-part of U.S. application Ser. No. 11/967,506 filed on Dec. 31, 2007, entitled "A FAULT PROTECTION CIRCUIT, METHOD OF OPERATING A FAULT PROTECTION CIRCUIT AND A VOLTAGE REGULATOR EMPLOYING THE SAME," commonly assigned with the present invention and incorporated herein by reference.

This application also claims the benefit of U.S. Provisional Application No. 60/882,680 entitled "Composite Power FET Structure for Linear Voltage Regulators with Negative Short Protection" to Mohammad A. Al-Shyoukh and Eric Blackall, filed on Dec. 29, 2006 which is incorporated herein by reference in its entirety.

TECHNICAL FIELD

The present disclosure is directed, in general, to voltage regulation and, more specifically, to a fault protection circuit, a method of operating a fault protection circuit and a voltage regulator employing the circuit or the method.

BACKGROUND

A low dropout voltage (LDO) regulator is a linear DC voltage regulator characterized by having a small input to output differential voltage, which reduces power dissipation associated with lower overall power supply efficiency. The LDO regulator also uses only a few critical components that include an error amplifier connected to a reference voltage and a feedback signal that is proportional to an output voltage. The error amplifier maintains the output voltage in a normal operating range as load current varies by responding to an error signal that results from comparing the reference voltage against the feedback signal. The error amplifier in turn generates an appropriate control signal to control the flow of current in a power stage and maintain a regulated value of the output voltage. LDO regulators are broadly applied in harsh environments that may contain opportunity for the regulated output to become faulted. Regulators can deal with some fault conditions. Nevertheless, improvements in dealing with special fault conditions would prove beneficial in the art.

SUMMARY

Embodiments of the present disclosure provide a fault protection circuit, a method of operating a fault protection circuit and a voltage regulator. In one embodiment, the fault protection circuit is for use with a voltage regulator and includes an output power section having first and second MOS transistors configured to provide a regulated voltage on an output node of the voltage regulator. The fault protection circuit also includes a gate pull-down section connected to the first and second MOS transistors and configured to provide a gate pull-down MOS transistor to limit a current through the first and second MOS transistors during a current overload fault condition on the output node.

In another aspect, the present disclosure provides a method of operating a fault protection circuit for use with a voltage regulator. The method includes providing a regulated voltage on an output node of the voltage regulator employing first and second MOS transistors and limiting a current through the first and second MOS transistors during a current overload fault condition on the output node employing a gate pull-down MOS transistor.

The present disclosure also provides, in yet another aspect, a voltage regulator. The voltage regulator includes an error amplifier having a control signal output, a first differential input connected to a reference voltage and a second differential input connected to a feedback signal. The voltage regulator also includes a feedback signal generator that provides the feedback signal corresponding to a regulated voltage on an output node of the voltage regulator. The voltage regulator further includes a fault protection circuit connected to the control signal output having an output power section with first and second MOS transistors that provide a regulated voltage on an output node of the voltage regulator. The fault protection circuit also has a gate pull-down section connected to the first and second MOS transistors that provides a gate pull-down MOS transistor to limit a current through the first and second MOS transistors during a current overload fault condition on the output node. The fault protection circuit further has an oxide protection section connected to the gate pull-down section that limits voltages across the first, second and gate pull-down MOS transistors during a voltage breakdown fault condition on the output node.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Fault conditions within a regulation and normal operating range of a voltage regulator are typically accommodated by normal functioning of the voltage regulator. Embodiments of the present disclosure provide protection for the voltage regulator that may encounter fault conditions to voltages that are outside its regulation and normal operating range. Embodiments discussed below protect the voltage regulator from two types of fault conditions on its output node.

A current overload fault condition results from shorting the output node to a voltage that is lower than the lowest voltage employed in the voltage regulator. The current overload fault condition, if not limited, may cause an output current of at least one regulator component to increase to the point of regulator failure. Similarly, a voltage breakdown fault condition results from shorting the output node to a voltage higher than a line input voltage to the voltage regulator. The voltage breakdown fault condition, if not limited, may cause at least one critical regulator component to fail due to voltage overload.

Figure 1:
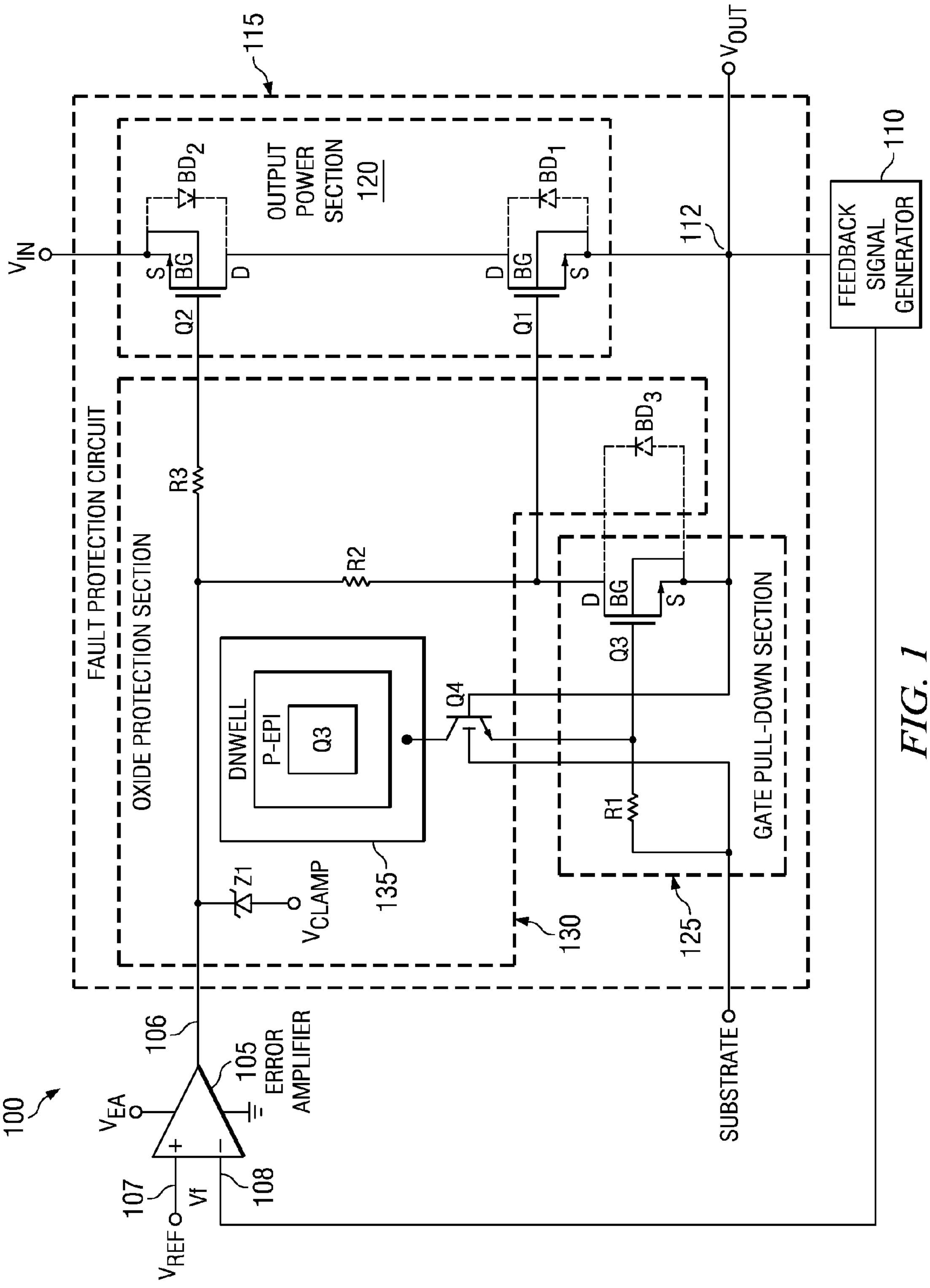
FIG. 1 illustrates a system diagram of a voltage regulator as provided by one embodiment of the disclosure.

FIG. 1 illustrates a system diagram of a voltage regulator 100 as provided by one embodiment of the disclosure. Although embodiments of the present disclosure may employ transistors of either polarity, an example employing n-type transistors is discussed with respect to FIG. 1. The voltage regulator 100 includes an error amplifier 105, a feedback signal generator 110 and a fault protection circuit 115. The error amplifier 105 includes a control signal output 106, a first differential input 107 connected to a reference voltage $V_{REF}$ and a second differential input 108 connected to a feedback signal $V_F$. In the present embodiment, the error amplifier 105 is connected between a positive supply voltage $V_{EA}$ and ground, as shown. In this embodiment, the feedback signal generator 110 provides the feedback signal $V_F$ corresponding to a scaled-down version of a regulated output voltage $V_{OUT}$ on an output node 112 of the voltage regulator 100. This scaled-down version of the regulated output voltage $V_{OUT}$ is compared with the reference voltage $V_{REF}$ to generate a control signal on the control signal output 106.

The fault protection circuit 115 is connected to the control signal output 106 and includes an output power section 120, a gate pull-down section 125 and an oxide protection section 130. The output power section 120 includes first and second NMOS transistors Q1, Q2 that provide the regulated output voltage $V_{OUT}$ on the output node 112. The first and second NMOS transistors Q1, Q2 have bulk or back gate (BG) connections connected to their respective sources (S), and drains (D) connected together thereby realizing first and second body diodes $BD_1$, $BD_2$ connected as shown.

The gate pull-down section 125 is connected to the first and second NMOS transistors Q1, Q2 and includes a gate pull-down NMOS transistor Q3 having a back gate (BG) connected to its source (S) thereby realizing a third body diode $BD_3$ connected as shown. The gate pull-down NMOS transistor Q3 limits a current through the first and second NMOS transistors Q1, Q2 during a current overload fault condition on the output node 112. The gate pull-down section 125 also includes a first resistor R1 connected between a substrate of the voltage regulator 100 and the gate of the gate pull-down NMOS transistor Q3, as shown. The gate pull-down NMOS transistor Q3 is a lower threshold voltage device (e.g., 0.7 volts) than the first NMOS transistor Q1 (e.g., 1.5 volts).

The oxide protection section 130 is connected to the gate pull-down section 125 and limits voltages across the first, second and gate pull-down transistors Q1, Q2, Q3 during a voltage breakdown fault condition on the output node 112. The oxide protection section 130 includes the third body diode $BD_3$ of the gate pull-down NMOS transistor Q3, second and third resistors R2, R3, a zener diode Z1 connected to a clamp voltage $V_{CLAMP}$, an isolation structure 135 and an NPN bipolar transistor Q4. The gate pull-down NMOS transistor Q3 is contained in the isolation structure 135 that allows a voltage difference to be provided between the gate pull-down NMOS transistor Q3 and the substrate during the voltage breakdown fault condition. The NPN bipolar transistor Q4 controls a value of the voltage difference corresponding to the voltage breakdown fault condition.

In normal operation, the voltage regulator 100 provides the regulated output voltage $V_{OUT}$ through a control loop containing the error amplifier 105, the output power section 120 and the error signal generator 110. If the regulated output voltage $V_{OUT}$ varies from its nominal value, the feedback signal $V_F$ is sensed by the error amplifier 105, compared against the reference voltage $V_{REF}$ and the control signal on the control signal output 106 is adjusted to restore the regulated output voltage $V_{OUT}$ to its nominal value. In the illustrated embodiment, the regulated output voltage $V_{OUT}$ is about five volts, which is provided from a line input voltage $V_{IN}$ that is about six volts. An error amplifier supply voltage $V_{EA}$ of about 12 volts is employed to provide sufficient headroom range for the error amplifier 105. However, the regulated output voltage $V_{OUT}$ is constrained to a range between about zero (ground) and six volts ($V_{IN}$), during normal operation.

Generally, the current overload fault condition would occur for any fault voltage on the output node 112 that is less than the negative supply voltage of the error amplifier 105, for the transistor polarities shown. In the illustrated embodiment, the current overload fault condition corresponds to a negative fault voltage that is connected to the output node 112.

For example, suppose that a negative two (−2) volts is applied to the output node 112. Since the gate of the gate pull-down NMOS transistor Q3 is referenced through the first resistor R1 to the substrate (which is tied to zero volts in this example) the gate pull-down NMOS transistor Q3 turns on and conducts, which in turn pulls the gate of the first NMOS transistor Q1 so that it is negative. This action limits the current of the first NMOS transistor Q1 (or deactivates it) since its gate-to-source voltage is constrained or clamped by the low threshold voltage gate pull-down NMOS transistor Q3. This prevents or limits output current from flowing through the first and second NMOS transistors Q1, Q2 to output node 112, thereby protecting the first and second NMOS transistors Q1, Q2 from current overload.

Generally, the voltage breakdown fault condition occurs for any fault voltage on the output node 112 that is more than the line input voltage $V_{IN}$, for the transistor polarities shown. In the illustrated embodiment, the voltage breakdown fault condition corresponds to a positive fault voltage that is greater than seven volts on the output node 112. Each of the first, second and gate pull-down NMOS transistors Q1, Q2, Q3 have oxide breakdown voltages of about 13 volts, which prohibits a gate-to-source voltage of more than 13 volts. For example, suppose a positive fault voltage of 40 volts is applied to the output node 112.

With 40 volts on the output node 112, the third body diode $BD_3$ conducts and clamps the gate of the first NMOS transistor Q1 to about 39 volts (40 volts less the diode drop across $BD_3$) thereby protecting it from voltage breakdown, since its gate-source voltage, in this case, is well within an existing 13 volt oxide breakdown limit. The zener diode Z1 provides a zener voltage of about 12 volts to the junction of the second and third resistors R2, R3. Since the input voltage $V_{IN}$ is about seven volts, there is a gate-to-source voltage of about five volts for the second NMOS transistor Q2 thereby protecting it from voltage break down.

The gate pull-down transistor Q3 requires protection from voltage breakdown, as well. A positive fault voltage of 40 volts on the output node 112 pulls the drain of the gate pull-down NMOS transistor Q3 to about 39 volts through the third body diode $BD_3$. This 40 volt fault voltage also causes the NPN bipolar transistor Q4 to conduct since its emitter is tied through the first resistor R1 to the substrate, which is held at zero volts. Conduction of the NPN bipolar transistor Q4 pulls the gate of the gate pull-down NMOS transistor Q3 to about 39 volts (40 volts minus the base-emitter junction voltage drop of the NPN bipolar transistor Q4), as well.

Recall that the gate pull-down transistor Q3 is contained in the isolation structure 135, as shown symbolically in FIG. 1.

The NPN bipolar transistor Q4 controls the voltage difference between the isolation structure 135 and the substrate to isolate the gate pull-down NMOS transistor Q3 and prevent it from experiencing voltage breakdown. A positive fault voltage of 40 volts on the output node 112 raises the isolation structure 135 to about 39 volts through activation of the NPN bipolar transistor Q4, as well. This provides an isolation environment for the gate pull-down NMOS transistor Q3 that is about one volt below the fault voltage of 40 volts, which allows adequate protection of the gate pull-down NMOS transistor Q3.

Figure 2A:
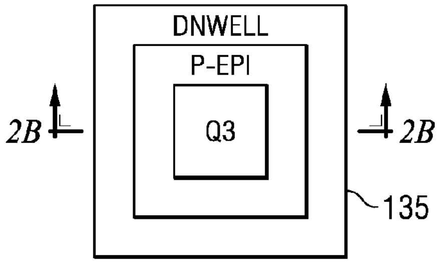
FIG. 2 illustrates a sectioned view of an isolation structure containing a gate pull-down MOS transistor as may be employed with the voltage regulator of FIG. 1.
Figure 2B:
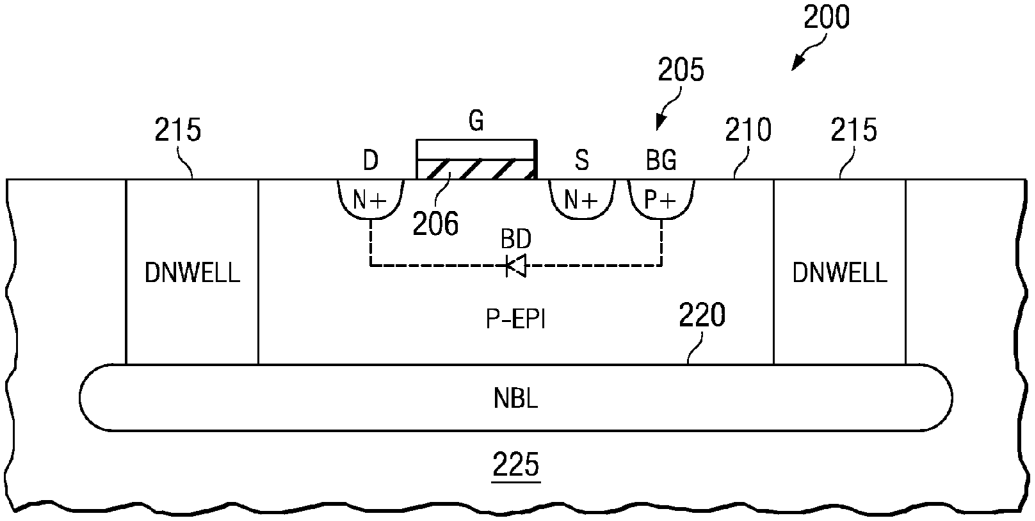

FIG. 2 illustrates a sectioned view of an isolation structure 200 containing a gate pull-down MOS transistor as may be employed with the voltage regulator 100 of FIG. 1. The isolation structure 200 includes a gate pull-down NMOS transistor 205 contained in a p-doped epitaxial region 210. The gate pull-down NMOS transistor 205 includes n-type source S and drain D areas separated by a gate region. An oxide layer 206 is employed between a gate G and the gate region, as shown. A p-type back gate BG (or bulk) connection to the p-doped epitaxial region 210 is also shown, as well as a body diode BD connection.

An outside portion of the isolation structure 200 is constructed of a surrounding DNWELL wall 215 and an n-type buried layer (NBL) 220 within a substrate 225. The p-doped epitaxial region 210 containing the gate pull-down NMOS transistor 205 forms an inside or isolated portion of the isolation structure 200. The isolation structure 200 allows the p-doped epitaxial region 210 containing the gate pull-down NMOS transistor 205 to be isolated from (i.e., have a voltage different from) the substrate 225, which is held at zero volts in the present embodiment. When the connected source S and back gate BG experience a voltage breakdown fault condition, the isolation structure 200 is pulled to within about a volt of the applied fault voltage, as discussed with respect to FIG. 1.

Figure 3:
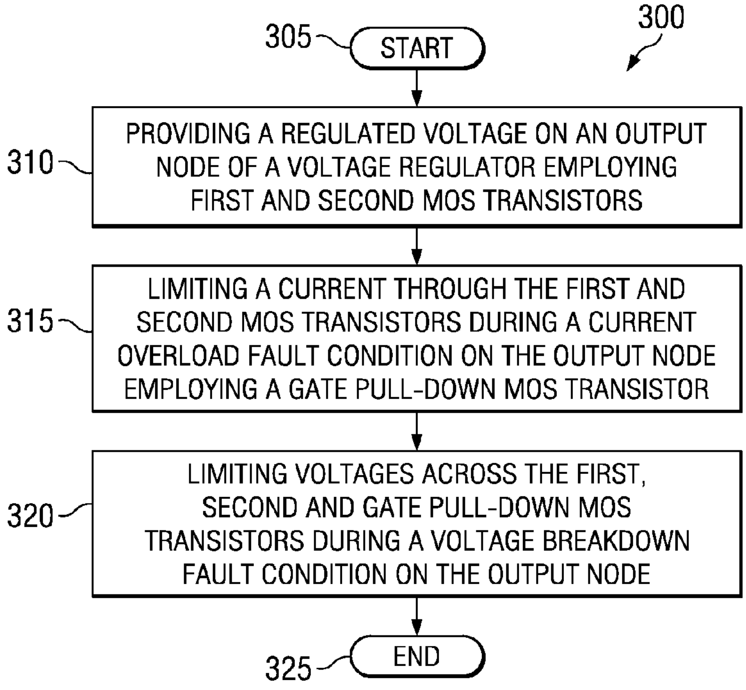
FIG. 3 illustrates a flow diagram of an embodiment of a method of operating a fault protection circuit carried out according to the principles of the present disclosure.

FIG. 3 illustrates a flow diagram of an embodiment of a method of operating a fault protection circuit, generally designated 300, carried out according to the principles of the present disclosure. The method 300 is for use with a voltage regulator and starts in a step 305. Then, in a step 310, a regulated voltage is provided on an output node of the voltage regulator employing first and second MOS transistors. A current is limited through the first and second MOS transistors during a current overload fault condition on the output node employing a gate pull-down MOS transistor, in a step 315.

Generally, the current overload fault condition is a fault condition on the output node that would cause a current through the first and second MOS transistors to increase beyond control or without regulation or limit. In one embodiment, the gate pull-down MOS transistor has a lower threshold voltage than the first MOS transistor and is connected between a gate of the first MOS transistor and the output node of the regulator. This condition and arrangement allows the gate pull-down MOS transistor to provide a substantially shorted connection between the gate and source of the first MOS transistor thereby limiting its current or keeping it from conducting.

Then, in a step 320, voltages across the first, second and gate pull-down MOS transistors are limited during a voltage breakdown fault condition on the output node. Generally, the voltage breakdown fault condition is a fault condition on the output node that would cause voltages to increase beyond breakdown values across the first, second and gate pull-down MOS transistors.

In one embodiment, a body diode of the gate pull-down MOS transistor is employed in limiting the voltages across the first, second and gate pull-down MOS transistors during the voltage breakdown fault condition. In one embodiment, the gate pull-down MOS transistor is contained in an isolation structure that provides a voltage difference between the gate pull-down MOS transistor and the substrate during the voltage breakdown fault condition. In one embodiment, a bipolar transistor controls a value of the voltage difference corresponding to the voltage breakdown fault condition. The method 300 ends in a step 325.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A fault protection circuit for use with a voltage regulator, comprising:
- an output power section having first and second MOS transistors configured to provide a regulated voltage on an output node of the voltage regulator; and
- a gate pull-down section connected to the first and second MOS transistors and configured to provide a gate pull-down MOS transistor to limit a current through the first and second MOS transistors during a current overload fault condition on the output node; and
- further comprising an oxide protection section connected to the gate pull-down section and configured to limit voltages across the first, second and gate pull-down MOS transistors during a voltage breakdown fault condition on the output node, wherein the gate pull-down MOS transistor is contained in an isolation structure that is configured to provide a voltage difference between the gate pull-down MOS transistor and the substrate during the voltage breakdown fault condition.

2. The circuit as recited in claim 1 wherein the gate pull-down MOS transistor is connected between a gate of the first MOS transistor and the output node.

3. The circuit as recited in claim 1 wherein the gate pull-down MOS transistor has a lower threshold voltage than the first MOS transistor.

4. The circuit as recited in claim 1 wherein a body diode of the gate pull-down MOS transistor is employed in limiting the voltages across the first, second and gate pull-down MOS transistors during the voltage breakdown fault condition.

5. The circuit as recited in claim 1 wherein a bipolar transistor is configured to control a value of the voltage difference corresponding to the voltage breakdown fault condition.

6. A method of operating a fault protection circuit for use with a voltage regulator, comprising:
- providing a regulated voltage on an output node of the voltage regulator employing first and second MOS transistors; and
- limiting a current through the first and second MOS transistors during a current overload fault condition on the output node employing a gate pull-down MOS transistor; and
- further comprising limiting voltages across the first, second and gate pull-down MOS transistors during a voltage breakdown fault condition on the output node, wherein the gate pull-down MOS transistor is contained in an isolation structure that provides a voltage difference between the gate pull-down MOS transistor and the substrate during the voltage breakdown fault condition.

7. The method as recited in claim 6 wherein the gate pull-down MOS transistor is connected between a gate of the first MOS transistor and the output node.

8. The method as recited in claim 6 wherein the gate pull-down MOS transistor has a lower threshold voltage than the first MOS transistor.

9. The method as recited in claim 6 wherein a body diode of the gate pull-down MOS transistor is employed in limiting the voltages across the first, second and gate pull-down MOS transistors during the voltage breakdown fault condition.

10. The method as recited in claim 6 wherein a bipolar transistor controls a value of the voltage difference corresponding to the voltage breakdown fault condition.

11. A voltage regulator, comprising:

an error amplifier having a control signal output, a first differential input connected to a reference voltage and a second differential input connected to a feedback signal;

a feedback signal generator that provides the feedback signal corresponding to a regulated voltage on an output node of the voltage regulator; and a fault protection circuit connected to the control signal output, including:

an output power section having first and second MOS transistors that provide a regulated voltage on an output node of the voltage regulator, a gate pull-down section connected to the first and second MOS transistors that provides a gate pull-down MOS transistor to limit a current through the first and second MOS transistors during a current overload fault condition on the output node, and an oxide protection section connected to the gate pull-down section that limits voltages across the first, second and gate pull-down MOS transistors during a voltage breakdown fault condition on the output node, wherein the gate pull-down MOS transistor is contained in an isolation structure that provides a voltage difference between the gate pull-down MOS transistor and the substrate during the voltage breakdown fault condition.

12. The voltage regulator as recited in claim 11 wherein the gate pull-down MOS transistor is connected between a gate of the first MOS transistor and the output node.

13. The voltage regulator as recited in claim 11 wherein the gate pull-down MOS transistor has a lower threshold voltage than the first MOS transistor.

14. The voltage regulator as recited in claim 11 wherein a body diode of the gate pull-down MOS transistor is employed in limiting the voltages across the first, second and gate pull-down MOS transistors during the voltage breakdown fault condition.

15. The voltage regulator as recited in claim 11 wherein a bipolar transistor controls a value of the voltage difference corresponding to the voltage breakdown fault condition.

* * * * *